United States Patent [19]
Houck

[11] Patent Number: 5,337,984
[45] Date of Patent: Aug. 16, 1994

[54] THERMAL HOLDERS FOR CUPS FOR USE IN VEHICLES

[76] Inventor: Deborah J. Houck, 811 Thompson St., Boyne City, Mich. 49712

[21] Appl. No.: 162,236
[22] Filed: Dec. 6, 1993
[51] Int. Cl.5 .............................................. A47G 23/02
[52] U.S. Cl. .................... 248/146; 224/273; 224/275; 224/281; 248/311.2
[58] Field of Search ................ 248/311.2, 146; 297/194; 224/42.43, 42.44, 42.45 R, 281, 275, 273; 211/71

[56] References Cited

U.S. PATENT DOCUMENTS

| | | | |
|---|---|---|---|
| 2,897,974 | 8/1959 | Cook | 224/273 X |
| 3,804,233 | 4/1974 | Gregg | 224/273 |
| 4,300,709 | 11/1981 | Page | 224/275 |
| 4,801,060 | 1/1989 | Thompson | 224/275 |
| 4,942,990 | 7/1990 | White | 224/273 X |
| 4,964,600 | 10/1990 | Lee | 248/146 |
| 5,037,162 | 8/1991 | Ransom | 224/42.45 R X |
| 5,044,577 | 9/1991 | Spearman | 224/42.45 R |
| 5,052,649 | 10/1991 | Hunnicutt | 224/42.45 R X |
| 5,060,899 | 10/1991 | Lorence | 297/194 X |
| 5,205,452 | 4/1993 | Mankey | 224/275 |

FOREIGN PATENT DOCUMENTS 6268 of 1895 United Kingdom ................ 248/146

*Primary Examiner*—J. Franklin Foss
*Attorney, Agent, or Firm*—Michael J. Colitz, Jr.

[57] ABSTRACT

A cup holder for use in a vehicle comprising a generally rectangular holder for cups formed of generally vertically extending sidewalls and a horizontally extending top wall, a base having a peripheral extent corresponding to that of the bottom of the side walls coupled to the bottom of the side walls with a plurality of apertures formed on the top wall, each aperture having a circular segment for receiving a cup and a radial segment for receiving the handle of a cup located in the circular segment.

7 Claims, 4 Drawing Sheets

THERMAL HOLDERS FOR CUPS FOR USE IN VEHICLES

BACKGROUND OF THE INVENTION

1. Field of the Invention

The present invention relates to thermal holders for cups for use in vehicles and more particularly pertains to thermal holders for large cups with an adapter ring for smaller cups.

2. Description of the Prior Art

The use of cup holders for use in vehicles is known in the prior art. More specifically, cup holders for use in vehicles heretofore devised and utilized for the purpose of holding cups in a car are known to consist basically of familiar, expected and obvious structural configurations, notwithstanding the myriad of designs encompassed by the crowded prior art which have been developed for the fulfillment of countless objectives and requirements.

Cup holders are disclosed in a large number of patents by way of example, U.S. Pat. No. 4,720,023 to Jeff discloses a combination insulated mug and beverage can holder.

U.S. Pat. Nos. 4,844,400 to Jasmagy and 4,678,154 to McFarland disclose further holders for cups and/or mugs.

Lastly, U.S. Pat. No. Des. 309,848 to Sokolski discloses a design for a mug holder.

In this respect, the thermal holders for cups for use in vehicles according to the present invention substantially departs from the conventional concepts and designs of the prior art, and in so doing provides an apparatus primarily developed for the purpose of thermal holders for cups for use in vehicles.

Therefore, it can be appreciated that there exists a continuing need for new and improved thermal holders for cups for use in vehicles which can be thermal holders for cups for use in vehicles. In this regard, the present invention substantially fulfills this need.

SUMMARY OF THE INVENTION

In view of the foregoing disadvantages inherent in the known types of cup holders for use in vehicles now present in the prior art, the present invention provides an improved thermal holders for cups for use in vehicles. As such, the general purpose of the present invention, which will be described subsequently in greater detail, is to provide a new and improved thermal holders for cups for use in vehicles apparatus and method which has all the advantages of the prior art thermal holders for cups for use in vehicles and none of the disadvantages.

To attain this, the present invention essentially comprises a thermal holder for cups of hot liquid for use in vehicles comprising, in combination, a generally rectangular holder for cups formed of four vertically extending sidewalls and a horizontally extending top wall integrally formed therewith; a rectangular base having a peripheral extent corresponding to that of the bottom side walls; releasable coupling means joining the base to the bottom of the holder; a pad formed of a closed cell elastomeric foam secured to the upper surface of the base within the space formed between the side walls, top wall and base; a plurality of large apertures formed through the top wall, each large aperture having a circular segment for receiving a large cup and an outwardly directed radial segment for receiving the handle of a cup received within the circular segment; and a plastic annular adapter adapted to be received and supported by the circular segments, for receiving a smaller cup, the adapter having an annular flange at its upper extent for contacting and being supported by the upper surface of the top wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermal holders for cups for use in vehicles which has all the advantages of the prior art cup holders and none of the disadvantages.

It is another object of the present invention to provide a new and improved thermal holders for cups for use in vehicles which may be easily and efficiently manufactured and marketed.

It is a further object of the present invention to provide a new and improved thermal holders for cups for use in vehicles which is of a durable and reliable construction.

An even further object of the present invention is to provide a new and improved thermal holders for cups for use in vehicles which is susceptible of a low cost of manufacture with regard to both materials and labor, and which accordingly is then susceptible of low prices of sale to the consuming public, thereby making such thermal holders for cups for use in vehicles economically available to the buying public.

Still yet another object of the present invention is to provide a new and improved thermal holders for cups for use in vehicles which provides in the apparatuses and methods of the prior art some of the advantages thereof, while simultaneously overcoming some of the disadvantages normally associated therewith.

Still another object of the present invention is to support cups of varying sizes in a car.

Yet another object of the present invention is to vary the size of cup supporting holes in a vehicle cup holder.

Even still another object of the present invention is to provide a new and improved a cup holder for use in a vehicle comprising a generally rectangular holder for cups formed of generally vertically extending sidewalls and a horizontally extending top wall, a base having a peripheral extent corresponding to that of the bottom of the side walls coupled to the bottom of the side walls with a plurality of apertures formed on the top wall, each aperture having a circular segment for receiving a cup and a radial segment for receiving the handle of a cup located in the circular segment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
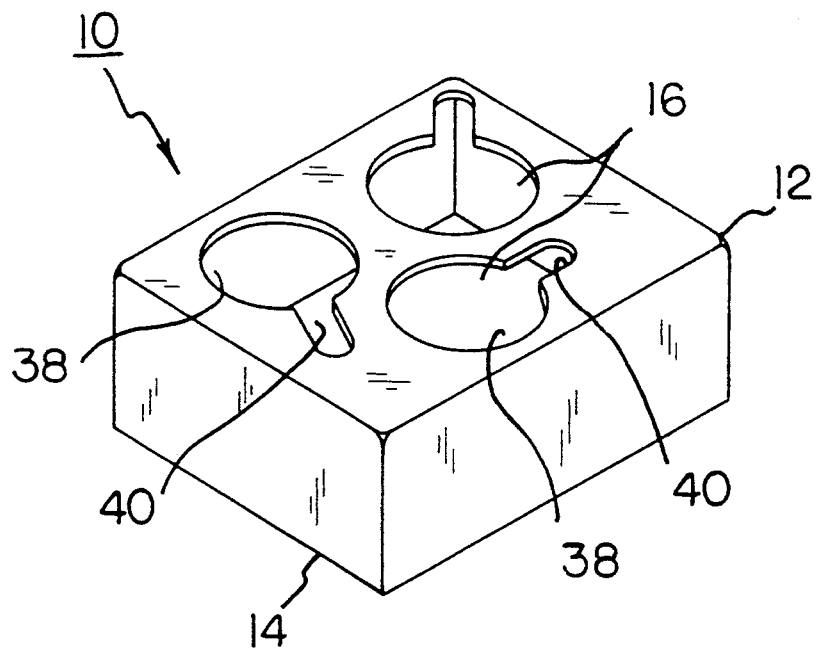
FIG. 1 is a perspective illustration of a thermal holder for cups for use in vehicles fabricated in accordance with the principles of the present invention.
Figure 2:
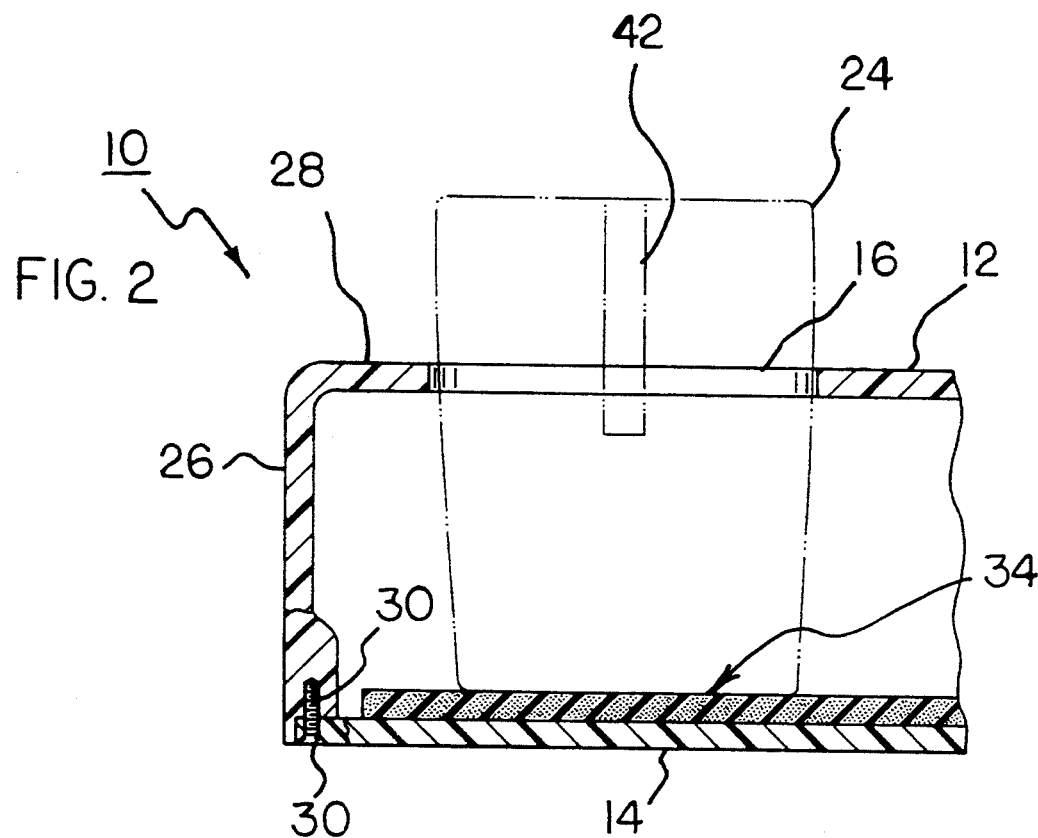
FIG. 2 is a sectional view taken vertically through a portion of the thermal holder for cups for use in vehicles shown in FIG. 1.
Figure 3:
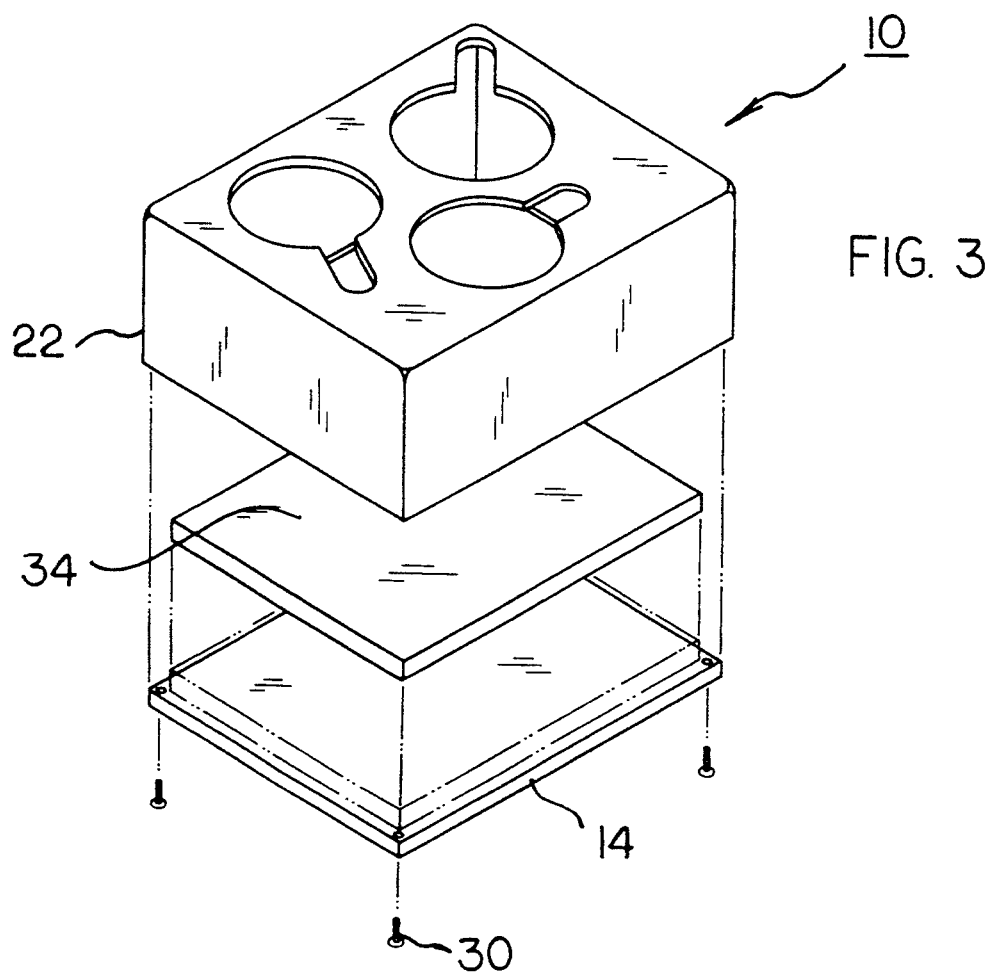
FIG. 3 is an exploded perspective view of the thermal holder for cups for use in vehicles shown in FIG. 1.
Figure 4:
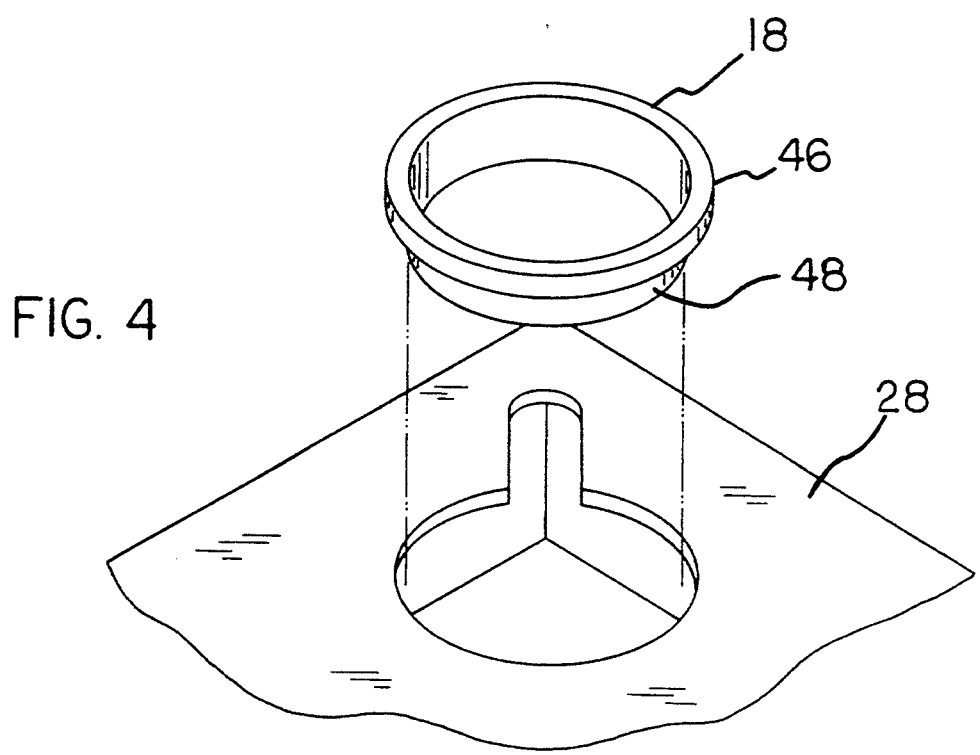
FIG. 4 is an exploded perspective view of a portion of the thermal holder for cups for use in vehicles of the prior Figures but illustrating an adaptor ring.

With reference now to the drawings, and in particular to FIG. 1 thereof, a new and improved thermal holders for cups for use in vehicles embodying the principles and concepts of the present invention and generally designated by the reference numeral 10 will be described.

More specifically, it will be noted by reference to FIGS. 1 through 4 that the invention includes a thermal holder 10 formed of an upper portion 12, a lower portion 14, aperture 16 formed in the upper portion and adapter rings 18 for varying the effective size of the apertures.

The upper portion 12 is a generally rectangular holder 22 for cups 24 formed of four vertically extending sidewalls 26 and a horizontally extending top wall 28. Such walls are integrally formed together with coupling their adjacent edges.

The base 14 is rectangular. It is formed with a peripheral extent corresponding to the peripheral extent of the bottom of the side walls 26.

Releasable coupling means are also provided in the form of screws 30. Such screws releasably join the base 14 to the bottom of the side walls 26. This is effected through holes in the base and aligned threaded apertures in the lower surfaces of the side walls adjacent to their corners.

For receiving the bottoms of cups and mugs, a pad 34 is utilized. Such pad 34 is formed of a closed cell elastomeric foam. It is secured as by an adhesive to the upper surface of the base 14 to be located within the space formed between the side walls, top wall and base. Vibration and spilling of the liquid within the cup or mug as caused by vibration of the vehicle is, consequently, abated.

Located in the top wall 28 are a plurality of large apertures 16. Such apertures are formed to extend through the top wall. Each large aperture 16 has a circular segment 38 for receiving a large cup 24. Each large aperture 16 also has an outwardly directed radial segment 40 for receiving the handle 42 of the supported cup 24 received within the circular segment 38.

The last component of the holder 10 is a plastic annular adapter 18. The adapter 18 is adapted to be received and supported by a circular segment 38. The purpose of an adapter 18 is for allowing an aperture 16 to receive a smaller cup when so desired. The adapter 18 has an annular flange 46 at its upper extent for contacting and being supported by the upper surface of the top wall 28. It also has a downwardly extending anular body 48 extending through the wall to preclude lateral movement.

Figure 5:
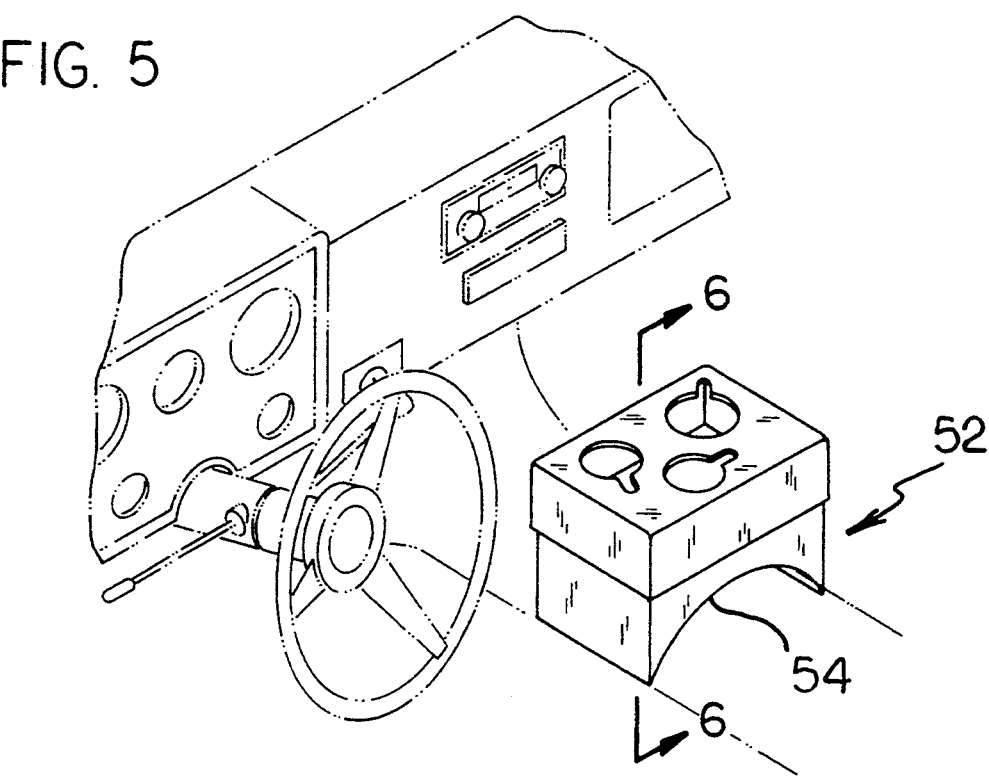
FIG. 5 is a perspective view of a thermal holder for cups for use in vehicles constructed in accordance with an alternate embodiment of the invention illustrating its positioning within a car.
Figure 6:
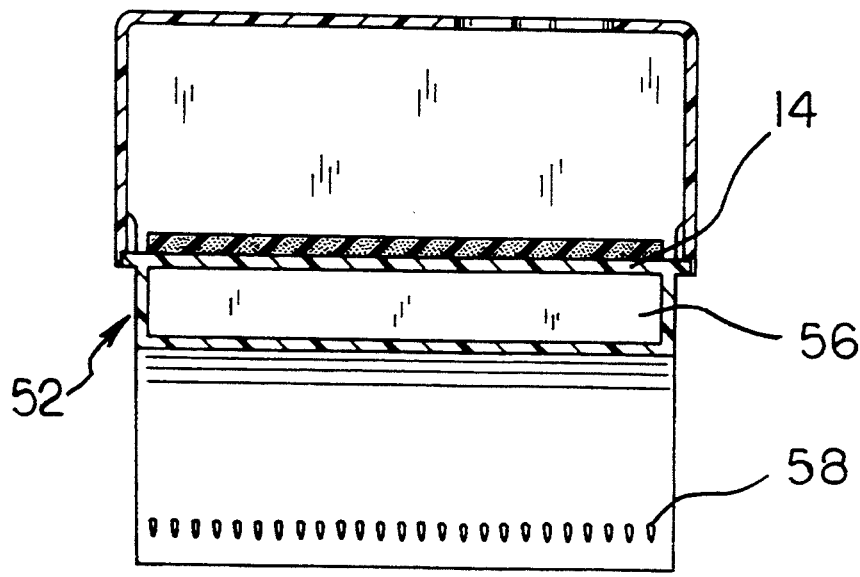
FIG. 6 is a sectional view taken along line 6—6 of FIG. 5.

An alternate embodiment of the invention is shown in FIGS. 5 and 6. Such alternate embodiment, in addition to the features described hereabove, further includes a support pedestal 12. Such pedestal is formed integrally with the base 14. It includes a curved lower surface 54 located on the underside of the base 14 and positioned on a correspondingly shaped surface of the vehicle between the driver's side and the passenger's side. The pedestal 52 is preferably model of a one piece construction with the base to form a hollow cavity 56 throughout the majority of its extent. The hollow cavity comprises projections or teeth 58 for engaging the vehicle thereby securing the thermal holder and vehicle.

Figure 7:
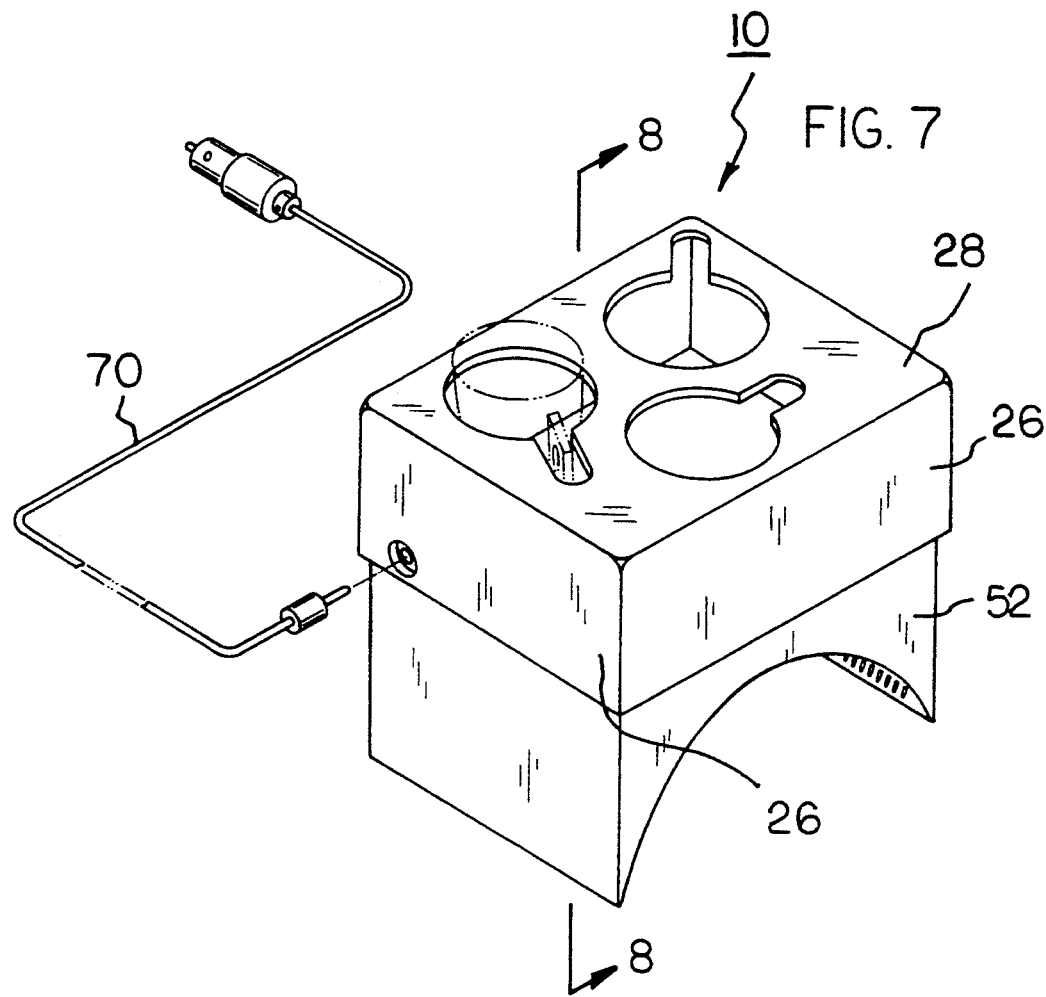
FIG. 7 is a perspective view of a thermal holder for cups for use in vehicles constructed in accordance with another alternate embodiment of the invention.
Figure 8:
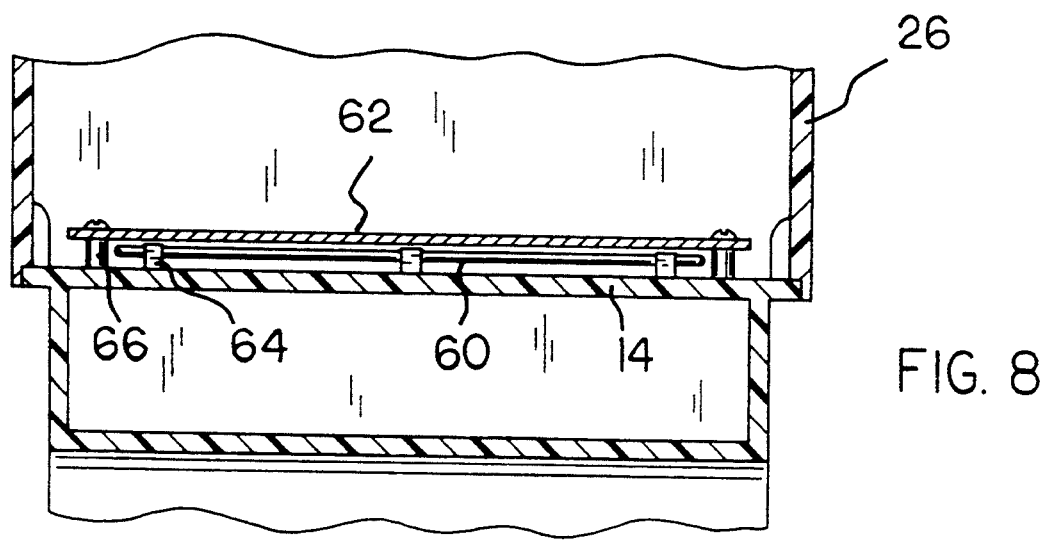
FIG. 8 is a sectional view taken along line 8—8 of FIG. 7.

The final alternate embodiment of the invention is illustrated in FIGS. 7 and 8. Such embodiment includes all of the features of the prior embodiment and further includes a heater 60 secured with respect to the base 14. Such heater 60 is in the form of an electrical resistance member secured to the top surface of the base 14. Located above the heater 60 is a rigid support plate 62 for receiving the lower surfaces of supported cups 24. Spaces 64 and 66 secure the heaters spaced above the base 14 and the support plate spaced above the heaters.

In this final embodiment, electrical connectors 70 couple the heater to a source of electrical potential, preferably a cigarette lighter of a vehicle for energizing the heater.

The entire device may be fabricated of my convenient material, preferably a thermal insulator. Materials may include plastic, fiberglass, wood or the like. The preferred material is plastic to allow for the molding the components.

Many people enjoy a hot cup of coffee or a cold beverage on their way to work every morning, others while traveling or on vacation. Some buy their beverage on the way, while others prepare it at home. The latter people may use an insulated cup to maintain the contents at a preferred temperature for an extended period of time. These cups are usually larger than the foam or paper cups purchased from a coffee shop, and they will not fit into the cup holders that are available for supporting the cups in a vehicle. This can be awkward, and require the person to continuously hold the larger insulated cup. Although the cup has a cover, spills can result from normal driving movements.

The present invention is a newly designed holder for these larger types of cups. It is rectangular in shape and has a wall around the perimeter. The surface has three cavities for accepting three mugs with handles. An adapter ring can be inserted in one of the holes to convert it to hold a normal hot or cold drink cup. The present invention can be permanently attached in a desired location in the vehicle, or can be set on the seat or armrest. It is ideal for use in all kinds of vehicles, from cars to boats, and especially for parents who travel with children.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A thermal holder for cups of hot liquid for use in vehicles comprising, in combination:
    a generally rectangular holder for cups formed of four vertically extending sidewalls and a horizontally extending top wall integrally formed therewith;
    a rectangular base having a peripheral extent corresponding to that of the bottom side walls;
    releasable coupling means joining the base to the bottom of the holder;
    a pad formed of a closed cell elastomeric foam secured to the upper surface of the base within the space formed between the side walls, top wall and base;
    a plurality of large apertures formed through the top wall, each large aperture having a circular segment for receiving a large cup and an outwardly directed radial segment for receiving the handle of a cup received within the circular segment;
    a plastic annular adapter adapted to be received and supported by the circular segments, for receiving a smaller cup, the adapter having an annular flange at its upper extent for contacting and being supported by the upper surface of the top wall.

2. A cup holder for use in a vehicle comprising:
    a generally rectangular holder for cups formed of generally vertically extending sidewalls and a horizontally extending top wall, a base having a peripheral extent corresponding to that of the bottom of the side walls coupled to the bottom of the side walls with a plurality of apertures formed on the top wall, each aperture having a circular segment for receiving a cup and a radial segment for receiving the handle of a cup located in the circular segment.

3. The apparatus as set forth in claim 2 and further including an annular plastic adapter adapted to be received and supported by a circular segment for receiving and supporting a circular cup, the adapter having an annular flange at its upper extent for being supported upon the upper surface of the top wall.

4. The apparatus as set forth in claim 2 and further including a pad formed of a closed cell elastomeric foam secured with respect to the upper surface of the base.

5. The apparatus as set forth in claim 2 and further including a support pedestal with a curved lower surface located on the underside of the base.

6. The apparatus as set forth in claim 2 and further including a heater secured with respect to the base.

7. The apparatus as set forth in claim 6 and further including electrical means couplable to a cigarette lighter of a car for energizing the heater.

* * * * *